Aug. 1, 1939.  A. B. GRANTHAM  2,168,202
WINDSHIELD WIPER
Filed April 23, 1937   2 Sheets-Sheet 1
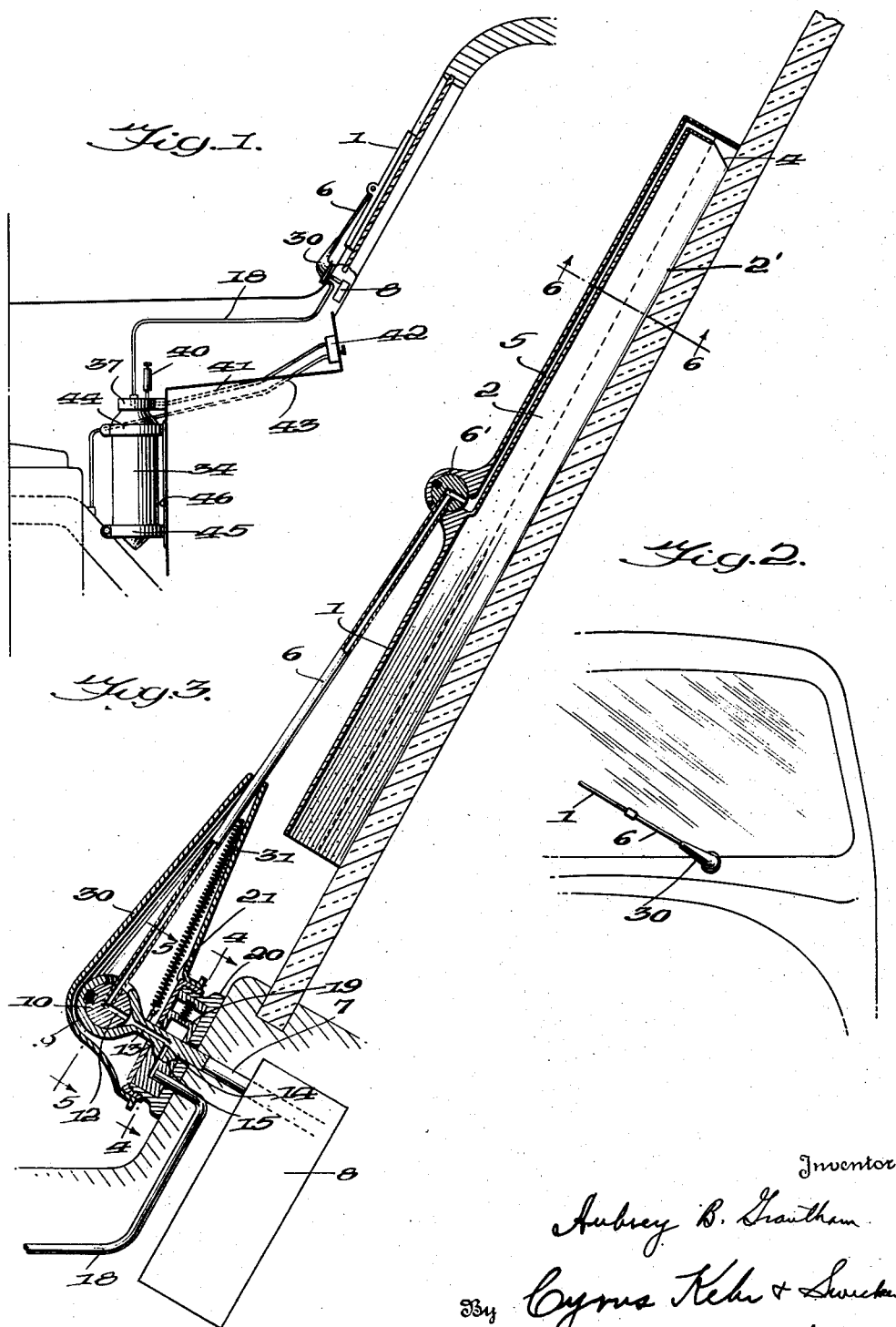
Inventor
Aubrey B. Grantham
By Cyrus Kehr & Swecker
Attorneys

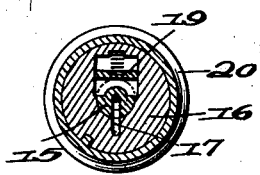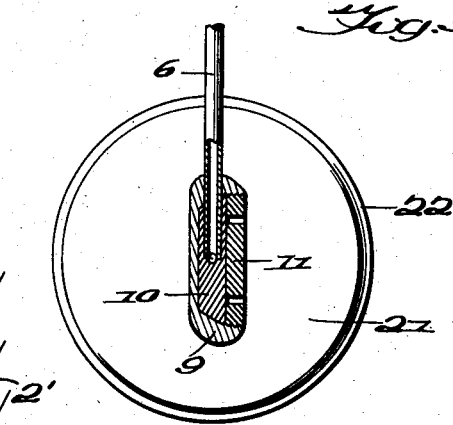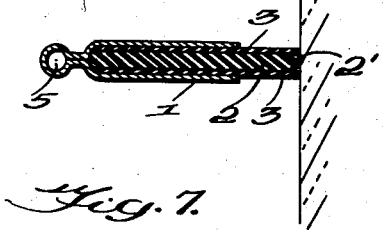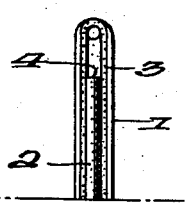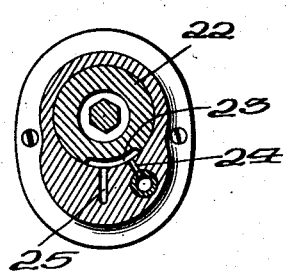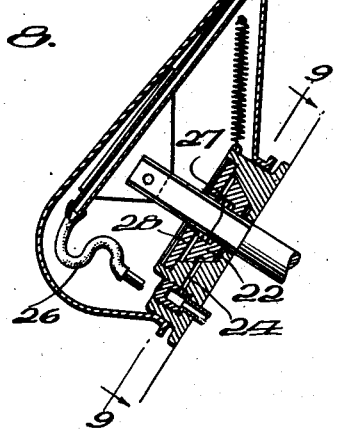

Patented Aug. 1, 1939

2,168,202

UNITED STATES PATENT OFFICE 2,168,202

WINDSHIELD WIPER

Aubrey B. Grantham, Douglaston, N. Y.

Application April 23, 1937, Serial No. 138,647

5 Claims. (Cl. 15—250)

This invention relates to an improvement in windshield wipers for installation on automobiles, airplanes, and motor driven sea craft, and more particularly to an all-weather windshield wiper, designed to remove and to prevent the accumulation of snow or sleet on the surface of the glass during freezing weather, and to remove dust and dirt from the glass.

The object of the invention is to improve the construction of the windshield wiper to enable it to be operated in the usual manner and yet to apply an anti-freeze solution to the windshield in freezing weather for the removal of snow or sleet from the glass or to apply a liquid to the windshield to clean road dirt and dust therefrom, whereby to maintain a clear windshield in different weather conditions to insure a clear view of the road at all times. This is provided in a windshield wiper that may be operated in the usual manner without changing any part of the apparatus or requiring other manipulation than the opening of a valve or other control for the liquid.

Another object of the invention is to improve the construction of the wiper element, so as to prevent snow or sleet from accumulating on the margin of the wiper range, which would otherwise build up by consecutive wipings until it restricts the range of the wiper to a distance short of the point of oscillation of the wiper, thus rendering the wiper inoperative in extreme weather. This defect and failure of defrosting wipers which have been proposed heretofore are overcome in this invention by applying the liquid to the glass at the top of the wiper blade or element, thus providing a continuous flow down the side margins of the field of the wiper and preventing the removed snow or sleet from accumulating at these edges.

Still another object of this invention is to provide a continuous or intermittent flow of defrosting liquid to the blade of the wiper under automatic control through ducts which are self-contained within the wiper structure.

This invention employs a novel wiper blade which contacts with the surface of the glass windshield to spread, when so desired, a thin film of defrosting or cleaning liquid over the vision portion of the glass from a point of discharge at the top of the wiper blade which is connected thereat with a source of liquid under pressure. The liquid is spread over the surface of the glass by the oscillating wiper blade and the surplus liquid is forced to flow into the snow or sleet which has been pushed beyond the range of the wiper blade, thus preventing such snow or sleet from accumulating at this point and from blocking the operation of the wiper.

The liquid is directed to the wiper blade through a self-contained hollow operating arm and control valve from a source of liquid supply, such as a storage container which may hold the liquid under pressure provided with a control on the dash of the vehicle to supply liquid to the windshield wiper whenever desired. In this way, a windshield wiper which operates normally to clear the vision during a rain in the usual way, can be operated in a simple manner to remove snow or sleet in freezing weather or dirt and dust during the dry weather, thus maintaining a clear vision under different weather conditions.

The invention is illustrated in a preferred embodiment thereof, together with a modification, in the accompanying drawings, in which:

Fig. 1 is a partial vertical sectional view, diagrammatically illustrating the system of the windshield wiper applied to a motor vehicle;

Fig. 2 is a front elevation of a portion of the motor vehicle showing the invention applied;

Fig. 3 is a vertical sectional view through the wiper structure applied, parts being in elevation;

Fig. 4 is a detail transverse sectional view through the control valve, substantially on the line 4—4 of Fig. 3;

Fig. 5 is a transverse sectional view through the operating arm connection, substantially on the line 5—5 of Fig. 3;

Fig. 6 is a transverse sectional view through the wiper blade on the line 6—6 of Fig. 3;

Fig. 7 is an elevation of the inner edge of the wiper blade at the upper end thereof;

Fig. 8 is a vertical sectional view of a modified form of valve construction; and Fig. 9 is a transverse sectional view therethrough substantially on the line 9—9 of Fig. 8.

Although the invention is shown and described as applied to an automobile, it is evident that it may be used on other types of motor vehicles, such as airplanes, motor boats, or the like.

The invention is designed to be operated by any desired or the usual windshield wiper motor, the construction of which need not be set forth in detail herein, and which motor usually operates a wiper blade approximately across the front of the windshield to prevent water from accumulating thereon. This invention has provision for supplying liquid to the blade for removing snow, sleet or dirt from the windshield.

In applying the invention, an especially constructed and novel windshield wiper blade is provided and is preferably used, which consists of a rigid channel forming the back of the blade, as designated generally by the numeral 1, which channel has inserted therein a stiff or semi-rigid rubber core 2, around which is folded lengthwise a strip of flexible rubber 3, which thereby encloses opposite sides of the core 2, and is secured between the sides of the channel back 1.

As shown in Figs. 3 and 7, the strip 3 extends about the upper end of the blade, closing said upper end at the point of introduction of liquid, and adjacent said upper end, the core 2 is cut away at 4 to enlarge the liquid opening thereat. The channel back 1 has a passageway 5, formed therein as by crimping, welding, or otherwise securing the edge portion of the channel at the upper portion of the blade.

The wiper blade is attached to and carried by a tubular operating arm 6, through a ground seat connection designated generally by the numeral 6', and which is similar to that shown in Fig. 5, as described hereafter. The lower end of the tubular operating arm 6 is connected with the operating shaft 7 of windshield wiping mechanism of the usual construction, designated generally by the numeral 8. The outer end of the operating shaft 7 carries a housing 9, in which a member 10 has a ground seat connection, and a cover plate 11 being provided in a side of the housing 9 for assembly, as shown in Fig. 5. The member 10 receives an end of the tubular arm 6 therein, which extends through a slot in the housing 9, as shown in Fig. 3, to permit slight oscillation of said arm and of the wiper blade as the latter accommodates itself to the plane of the windshield.

The member 10 has a transverse passageway 12 therethrough approximately in alignment with an axial passageway 13 in the outer end of the operating shaft 7, which passageway 13 turns laterally at 14, through a lug 15 formed at one side of the operating shaft 7, as shown in Fig. 4.

The lug 15 has a ground seat connection in a valve disc 16, provided with a lateral passageway 17 in communication with a tube 18 which extends to a source of fluid supply. The lug 15 is held firmly on its seat by a spring-pressed follower 19, mounted in the valve disc 16. The valve structure thus formed is enclosed by housing sections 20 and 21, screw-threaded together and adapted to be mounted on the motor vehicle in front of the windshield wiper motor. This valve is designed to operate to establish communication between the tube 18 and the hollow operating arm 6, for a supply of liquid thereto intermittently as the passageway 14 in the lug 15 registers with the passageway 17 in the valve disc 16, during alternate rotation of the shaft 7 in different directions.

Figs. 8 and 9 show a slightly modified form of flow control valve that is designed to be installed on vehicles having windshield wipers which have been used heretofore and which may be of any standard form. This invention can be applied thereto with only slight modification of the existing wiper operating shaft and the application of the improved control valve hollow arm and wiper thereto. In this modified form of control valve, the wiper shaft has a valve disc 22 splined thereon with a groove 23 in the surface of said disc in position to register with liquid inlet and outlet ports 24 and 25, the latter of which is adapted to be connected by a flexible connection 26, with the hollow operating arm of the wiper blade. The valve disc 22 is conical and is normally held in a tightly seated condition by a spring 27 which is interposed between said disc and a cover plate 28. As the valve disc 22 is oscillated by the wiper motor, communication will be established intermittently between the source of liquid supply and the tubular wiper arm to supply liquid to the wiper connected therewith.

In both forms of control valves shown and described, liquid will be supplied to the wiper blade intermittently during operation when the source of liquid supply is connected with the control valve, but the flow of liquid stops immediately as soon as the wiper blade stops operating in either extreme position. This prevents any continued leakage of the liquid from the blade when the wiper is not in operation.

The connection between the operating shaft and the tubular arm 6 is preferably enclosed in a streamlined cover 30 which is shown as loosely mounted on the casing member 21 and has a spring 31 connected therewith and with the shaft 7 for holding the wiper blade in contact with the surface of the windshield.

The liquid supply duct 18 is shown in Fig. 1, as extending to a container 34. This container 34 may be so designed as to permit the manufacturer of the apparatus to regulate the sale of liquid and the kind of liquid that is subsequently used in the wiper, after it has been installed in the automobile, in order to prevent the use of unsatisfactory liquids which might damage the wiper blade or the vehicle in which it is used. The container may be formed of glass, metal, or other suitable material and has an inverted conical bottom into which the tube 18 extends in order to discharge substantially all of the liquid from the container. The top of the container is screw-threaded into a discharge cap 37.

The cap 37 may be provided with a valve 40 to release excess pressure from the container and it has an air inlet tube 41, connected therewith which extends to a valve 42 mounted on the dash or any other convenient position, as shown in Fig. 1, and which valve in turn is connected through a tube 43 with a source of pressure such as the exhaust manifold of the engine and which supplies air under pressure to the top of the container 34, when the control valve 42 is open.

The container 34 is adapted to be screwed into the cap 37 and is inserted in a spring clamp 44 and a bottom clamp 45, which are supported from a back plate 46 and which serve to securely mount the container in a convenient position in the vehicle, such for instance, as under the hood thereof.

In this way, the opening of the valve 42 supplies air under pressure to the interior of the container 34, sufficient to discharge liquid therein through the tube 18 to the control valve and through said valve to the tubular arm 6, thence through the duct 5, to the upper end of the wiper blade. The wedge shaped inner edge 2' of the blade has special utility in this invention, inasmuch as it permits the wiper to be started in operation at times when the windshield may be coated with sleet by having a conformatory edge that will glide over the sleet, without undue wear or damage to the flexible edges 3 of the blade, until the flow of liquid has loosened said sleet from the glass. The wedge-shaped inner edge 2' of said blade also provides spaces between the same and the sides of the rubber strip 3, through which the liquid may flow lengthwise of the blade to be spread over the surface of the glass by the oscillating motion of the blade, thus providing a thin film of defrosting or cleaning liquid over the vision portion of the glass directly in front of the driver. The surplus liquid is forced to flow into the snow or sleet or dirt which has been pushed beyond the range of the wiper blade, thus preventing an accumulation at this point and fully cleaning the vision portion during all weather conditions.

It is apparent that with the air pressure controlled in this manner an even flow of the liquid can be maintained to the windshield wiper. This flow is maintained even though the automatic flow control valves are omitted, and with such an omission the apparatus would then constitute a manually controlled system as described in this invention. It is contemplated that the invention herein described may be installed also for manual control and operation, and the omission of the automatic flow valve would not impair the invention. The inclusion of the automatic flow valve, as hereinbefore described, makes the system fully automatic when operated during such times as liquid is desired on the windshield.

It will be observed that all of the sketches illustrate a bottom-type of windshield wiper, since this appears to be the most satisfactory for operation as a defrosting unit. However, it is also apparent that the same principle may be applied to a wiper operated from the top of the windshield by simply reversing the wiper blade in the operating arm.

I claim:

1. In a windshield wiper, a wiping blade comprising a semi-rigid non-absorbent rubber core, a strip of flexible material extending lengthwise along opposite sides of the core and around an end thereof, and a channel embracing said core and strip of flexible material for supporting the same, said core having an inner wiping edge portion substantially wedge-shaped in cross-section with the sides thereof tapering inwardly in spaced relation from the sides of the strip of flexible material.

2. In a windshield wiper, the combination of a wiping blade, a tubular arm supporting said blade, an operating shaft carrying said arm, swiveled connections between the arm and the blade and shaft, respectively, and having liquid passageways therethrough, means for supplying liquid to the tubular arm, and a valve controlled by said shaft for regulating the supply of liquid.

3. In a windshield wiper, the combination of a wiping blade, a tubular arm supporting said blade, motor means having an operating shaft carrying said arm, swiveled connections between the arm and the blade and shaft, respectively, said connections having passageways therethrough communicating with the interior of the tubular arm, the operating shaft having a passageway therein communicating through the adjacent swiveled connection with the tubular arm, means for supplying fluid under pressure to the passageway in the shaft, and valve means connected with the shaft for controlling said supply of fluid.

4. A windshield wiping blade comprising a substantially rigid non-absorbent core having a wedge-shaped wiping edge, and strips of material arranged at opposite sides of the core and arranged to provide grooves between the same and the wiping edge adapted for communication with a source of liquid supply.

5. In a windshield wiper, the combination of a wiping blade including a substantially rigid core having a wedge-shaped wiping edge, strips of material extending along opposite sides of the core and spaced from the wedge-shaped wiping edge forming passageways between the same and the wedge-shaped edge, and means connected with the upper end of the blade and having open communication with both of said passageways substantially at an end of the blade for flow of liquid downwardly along opposite sides of said wedge-shaped wiping edge.

AUBREY B. GRANTHAM.